Patented July 10, 1934

1,966,013

UNITED STATES PATENT OFFICE 1,966,013

AUXILIARY BAKING MEANS

Ernst Komm, Dresden, Germany, assignor to firm: Theodor Schluter sen., Dresden, Germany No Drawing. Application December 15, 1932, Serial No. 647,471. In Germany November 23, 1931

11 Claims. (Cl. 99—10)

In recent years lactic acid has been employed to an increasing extent as an auxiliary baking means in bread bakeries in order to circumvent the tedious leaven process as when using yeast. Lactic acid occurs in commerce only in the liquid form in concentrations of various strengths. This liquid form makes the use of the lactic acid in bakehouses extraordinarily difficult. In the first place, the accurate dosing of the acid, i. e. adjustment of the quantity added, is very difficult to the bakehouse workers who are inexperienced in this respect. The addition of concentrated acid which is slightly too much or slightly too little in amount extensively changes the character of the bread. Further, in most bakeries there are no suitable vessels for measuring the acids.

These and other aspects have given rise to endeavours to convert the commercial liquid lactic acid of various concentrations into a solid or pasty form more suited for bakers' use.

It has already been proposed to bind lactic acid, in combination with other fatty acids and acid salts as well, with rice flour and other flour and to dry and to pulverize this mixture, or to bind lactic acid with disintegrated rice flour and, without any artificial drying process, to prepare a jelly-like paste from the binding mixture. All the lactic acid preparations converted artificially in this manner into the solid form have the one disadvantage that they distribute themselves more slowly than corresponds to the practical requirements of bakery operations, particularly large scale bakery operations.

It is further known to adsorb lactic acid by adsorbents in order partly to purify it and partly to use it in this adsorbed form. Use of lactic acid taken up in adsorbents does not come into consideration at all for bakehouse purposes on account of the relatively high additions of adsorbents, such as charcoal or brown pectin substances. Moreover, the adsorpton process is extraordinarily irrational as compared with the new method of working, since very large quantities of adsorptive substances are necessary completely to adsorb lactic acid.

The object of the present process is to make a lactic acid preparation in the form of a solid which dissolves readily in cold water to form a clear solution. The principle whereby this is effected consists in mixing lactic acid and salts of the alkaline earths the acid components of which in the free form have a weaker hydrogen ion activity than the lactic acid, said salts being admixed in a quantity which is smaller than that necessary for the exclusive formation of alkaline earth lactates. The most suitable salts are the carbonates of the alkaline earths, more particularly calcium carbonate.

A transformation then takes place accompanied by strong evolution of carbon dioxide and evolution of heat, at the completion of which the initially completely liquid medium is converted into a solid substance. According to the magnitude of the excess of lactic acid this solid product possesses at the start a more or less ointment-like consistency. On standing in the air, however, the product becomes completely solid in a minimum time. Also, it can be completely dried in the vacuo at low temperatures. The product has a white appearance and dissolves very readily in cold water. The aqueous solution reacts very strongly acidic. The product is not identical with the known acid calcium lactates. It has a sharp melting point and on fusion forms a clear liquid.

A whole series of other substances can be added during the production process, thus, for example, rice flour, yeast in the dried and pressed form, flours, fatty acids, and so forth. The addition must be effected prior to the stirring of lactic acid with the alkaline earth salt, since in this way an intimate admixture and satisfactory distribution of even the smallest quantities of the addition substance in the solid lactic acid are best produced.

Example

For making the lactic acid preparation in the solid form preferably commercial 80% lactic acid intended for human consumption is used. However, one can also start from other varieties of lactic acid of different concentrations. Five grams of calcium carbonate are weighed out and gradually introduced, whilst continuously stirring, for example into 75 c. c. of 80% lactic acid intended for internal consumption. The quantity of lactic acid used may also be chosen differently as desired. Five grams of calcium carbonate still form masses which will set for example with 200 c. c. of 80% lactic acid. After stirring the calcium carbonate in the lactic acid a transformation process gradually begins in which carbon dioxide escapes, a heat evolution is observable, and the product gradually sets in the form of a froth. When other solid substances are added (yeast, rice flour, substances which prevent mould formation on the baked articles) these are most advantageously intimately admixed with the calcium carbonate by rubbing up before introduction into the lactic acid. Additions in liquid form (fatty acids) are advantageously effected to the lactic acid directly before the introduction of the calcium carbonate.

What I claim is:

1. A process for making an auxiliary baking means consisting in mixing an alkaline earth carbonate with lactic acid, the quantity of carbonate used being less than is necessary for the exclusive formation of alkaline earth lactates.

2. A process for making an auxiliary baking means consisting in mixing calcium carbonate with lactic acid, the quantity of carbonate used being less than is necessary for the exclusive formation of calcium lactate.

3. A process for making an auxiliary baking means consisting in mixing with lactic acid at least one alkaline earth salt having an acid component which, in the free state, has a weaker hydrogen ion activity than lactic acid, the quantity of salt used being less than is necessary for the exclusive formation of alkaline earth lactates.

4. A process as claimed in claim 3 in which a rising agent is added prior to the mixing of the alkaline earth salt with lactic acid.

5. A process as claimed in claim 1 in which a rising agent is added prior to the mixing of the alkaline earth carbonate with lactic acid.

6. A process as claimed in claim 2 in which a rising agent is added prior to the mixing of the calcium carbonate with lactic acid.

7. A process for making an auxiliary baking means consisting in mixing an alkaline earth carbonate with approximately 80% edible lactic acid, the quantity of carbonate used being less than is necessary for the exclusive formation of alkaline earth lactates.

8. A process for making an auxiliary baking means consisting in mixing calcium carbonate with approximately 80% edible lactic acid, the quantity of carbonate used being less than is necessary for the exclusive formation of calcium lactate.

9. A process for making an auxiliary baking means consisting in mixing calcium carbonate with lactic acid, the quantity of calcium carbonate employed being about 6% of the mixture.

10. A process for making an auxiliary baking means comprising, in combination, the following steps, mixing an alkaline earth carbonate with lactic acid, the quantity of carbonate used being less than is necessary for the exclusive formation of alkaline earth lactates, and allowing the mixture to stand during the subsequent evolution of heat and carbon dioxide until the product solidifies.

11. The process of making an auxiliary baking means according to claim 10 which includes the additional step of adding a rising agent.

ERNST KOMM.